Figure 5:
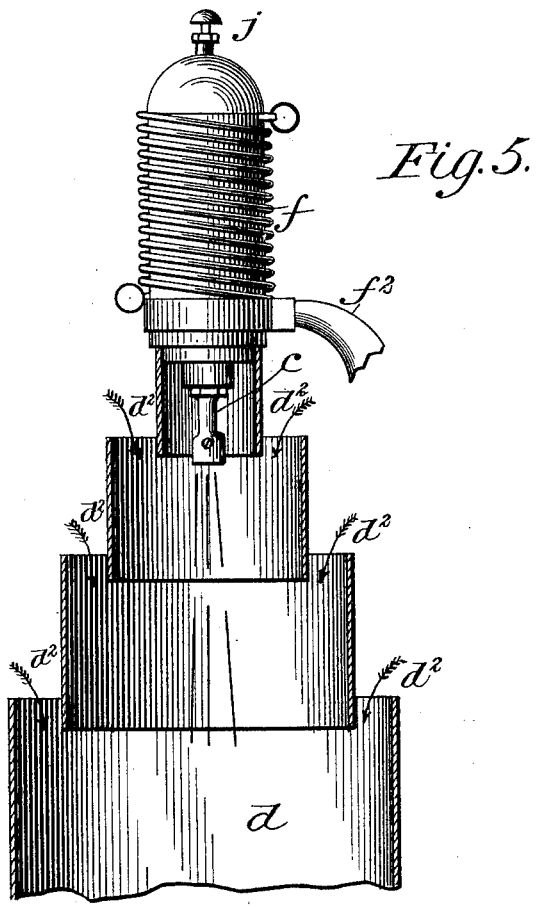

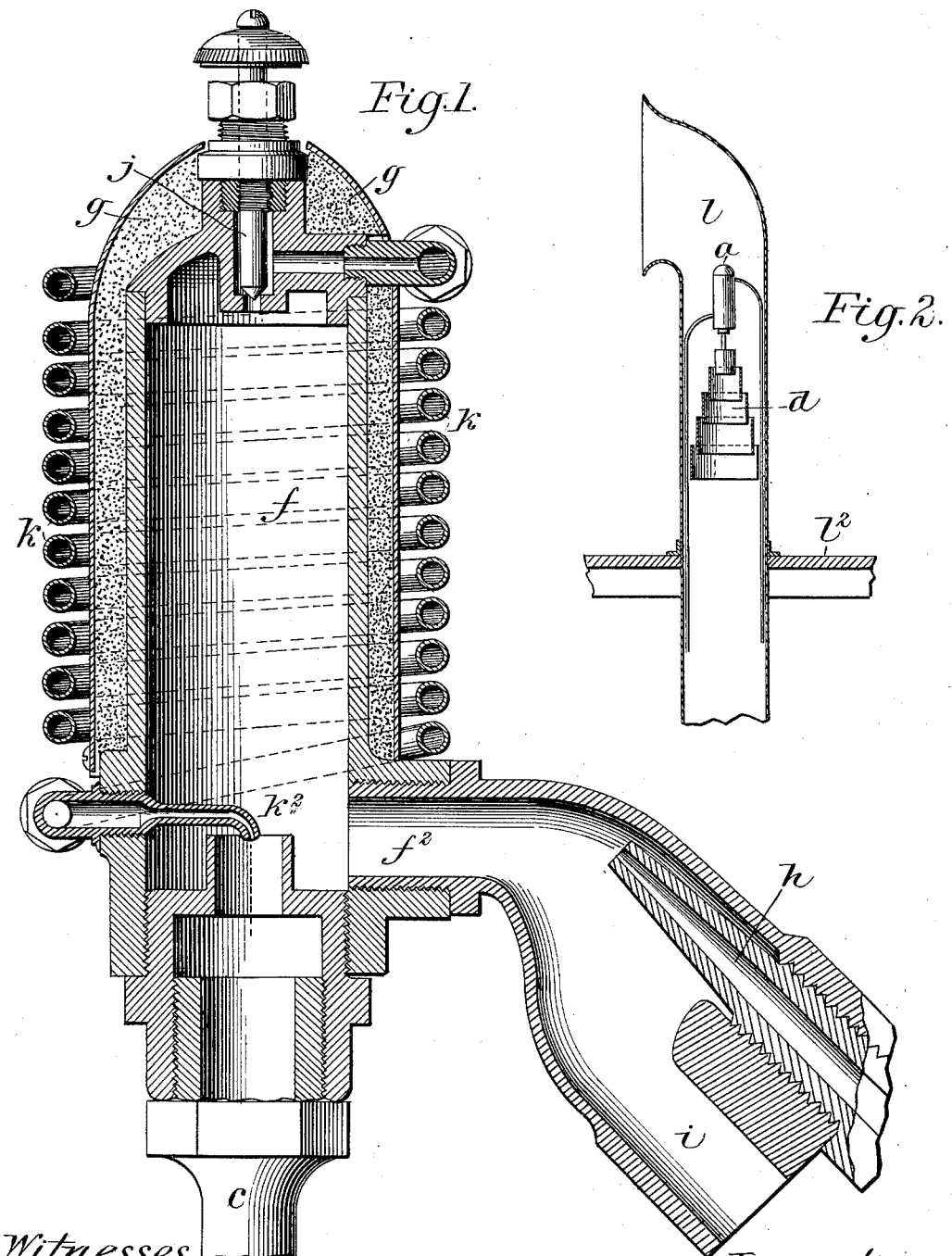

(No Model.) 3 Sheets—Sheet 2.
C. HARRIS & T. F. EVANS.
VENTILATING APPARATUS.
No. 592,468. Patented Oct. 26, 1897.
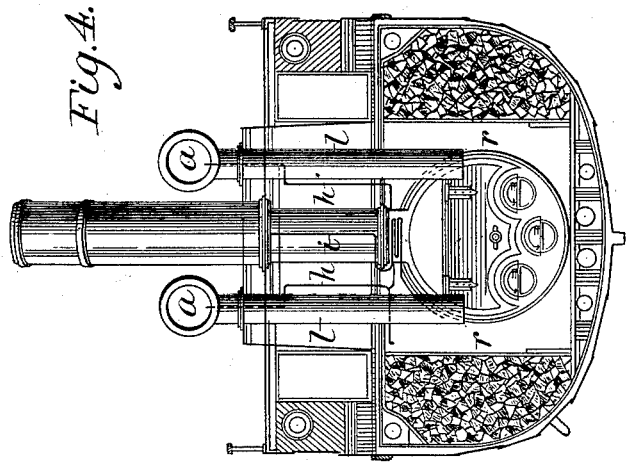
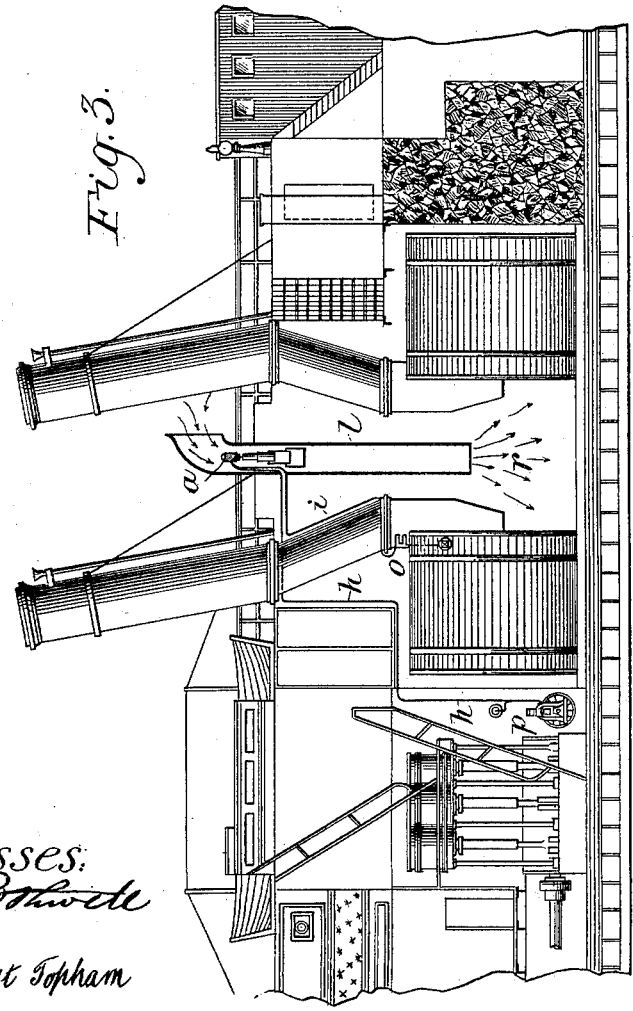

(No Model.) 3 Sheets—Sheet 3.
C. HARRIS & T. F. EVANS.
VENTILATING APPARATUS.

No. 592,468. Patented Oct. 26, 1897.

UNITED STATES PATENT OFFICE.

CHARLES HARRIS AND THOMAS FRANCIS EVANS, OF MANCHESTER, ENGLAND.

VENTILATING APPARATUS.

SPECIFICATION forming part of Letters Patent No. 592,468, dated October 26, 1897.

Application filed July 26, 1895. Serial No. 557,252. (No model.) Patented in France May 4, 1895, No. 234,305; in Germany May 4, 1895, No. 89,206; in Belgium May 6, 1895, No. 115,435, and in Italy June 22, 1896, LXXXI, 253.

*To all whom it may concern:*

Be it known that we, CHARLES HARRIS, manager, and THOMAS FRANCIS EVANS, undermanager, subjects of the Queen of Great Britain and Ireland, residing at Manchester, in the county of Lancaster, England, have invented certain new and useful Improvements in Ventilating Apparatus, (for which we have obtained Letters Patent in Belgium, No. 115,435, bearing date May 6, 1895; in France, No. 234,305, dated May 4, 1895; in Germany, No. 89,206, dated May 4, 1895, and in Italy, LXXXI, 253, dated June 22, 1896;) and we do hereby declare that the following is a full, clear, and exact description thereof.

Our invention consists of certain improved apparatus for producing a forced draft in the wind-sails or other ventilating shafts or trunks of steamers, vessels, and the like by means of a jet of compressed air or steam, or air and steam combined, and more or less cooling or dampening the air in the process.

Referring to the drawings sent herewith, Figure 1 shows a side section of our apparatus. Fig. 2 is a cross-section of a vessel's wind-sail, showing the method in which the motive apparatus is inclosed and placed therein. Figs. 3 and 4 are respectively a longitudinal and cross-section of a portion of a steamer, showing general plan of arrangement of apparatus and its adjuncts. Fig. 5 is a side view of the apparatus with parts shown in section.

In Fig. 1, $f$ indicates an air or steam chamber incased in a suitable jacket of non-conducting material $g$ and suitably formed at its lower end to admit of the attachment of a suitable nozzle or outlet $c$. Compressed air or steam is used in this apparatus, as required, and is admitted at the inlet $f^2$ by means of the openings respectively marked $h$ and $i$ and passes out by way of the nozzle $c$ in a suitable jet through a series of concentric rings, (shown on Fig. 2 and marked $d$,) drawing in air for ventilation through the annular openings. At the top of the chamber $f$ is a suitable valve $j$, by means of which when it is desired to damp the air supplied a small portion of steam can be admitted into the cooling-coil $k$, falling when condensed into the nozzle $c$ through the inlet $k^2$.

In Fig. 2, $a$ indicates the air or steam chamber; $d$, the concentric rings, terminating in trunk or shaft $d^3$; $l$, the wind-sail, and $l^2$ the ship's deck.

The arrangement is further shown in Fig. 5, where the air or steam chamber $f$ is shown placed in the series of concentric rings $d$, drawing by means of jet of air or steam from nozzle $c$ drafts of air through the annular openings $d^2$, as shown by curved arrows on drawings.

Where the apparatus is used for a steam-jet, we prefer to previously thoroughly dry the steam used by means of a superheater placed in the smoke-box of the steam-boiler or other suitable place.

A suitable general arrangement is shown in Figs. 3 and 4, $l$ indicating the wind-sail, in which is placed the air or steam chamber $a$, supplied with compressed air from the air-compressor $p$ by means of pipes $h$, or with steam from the superheater $o$ by means of pipes $i$, forcing by means of concentric rings $d$ any requisite current of air into stoke-hole $r$.

Having fully described our invention, what we claim, and desire to secure by Letters Patent, is—

The combined apparatus consisting of air or steam chamber $f$, outlet-nozzle $c$, valve $j$, cooling-coil $k$, with the necessary fittings thereof, and a series of concentric rings $d$, as described and shown hereinbefore and in the accompanying drawings, for the purposes set forth.

In testimony that we claim the foregoing we have hereunto set our hands this 5th day of July, 1895.

CHARLES HARRIS.
  THOMAS FRANCIS EVANS.

Witnesses:
 CHARLES EDWARD,
 JOHN HENRY TOPHAM.